United States Patent
Aschoff

(10) Patent No.: US 10,284,965 B2
(45) Date of Patent: May 7, 2019

(54) METHOD FOR THE AUTOMATED ASCERTAINMENT OF PARAMETER VALUES FOR A HEARING AID

(71) Applicant: SIVANTOS PTE. LTD., Singapore (SG)

(72) Inventor: Stefan Aschoff, Eckental (DE)

(73) Assignee: Sivantos Pte. Ltd., Singapore (SG)

( * ) Notice: Subject to any disclaimer, the term of this patent is extended or adjusted under 35 U.S.C. 154(b) by 155 days.

(21) Appl. No.: 15/606,959

(22) Filed: May 26, 2017

(65) Prior Publication Data

US 2017/0347205 A1 Nov. 30, 2017

(30) Foreign Application Priority Data

May 30, 2016 (DE) .......................... 10 2016 209 329

(51) Int. Cl.
*G06F 17/27* (2006.01)
*H04R 25/00* (2006.01)

(52) U.S. Cl.
CPC ............. *H04R 25/30* (2013.01); *G06F 17/27* (2013.01); *H04R 25/55* (2013.01); *H04R 25/70* (2013.01); *H04R 2225/39* (2013.01); *H04R 2225/41* (2013.01); *H04R 2225/55* (2013.01)

(58) Field of Classification Search
CPC . G10L 17/27; H04R 2225/39; H04R 2225/41; H04R 2225/55
See application file for complete search history.

(56) References Cited

U.S. PATENT DOCUMENTS

| 7,283,842 | B2 | 10/2007 | Berg | |
| 8,401,199 | B1* | 3/2013 | Banerjee | H04R 25/30 |
| | | | | 381/58 |
| 9,323,893 | B2* | 4/2016 | Berry | G06F 19/3418 |
| 9,390,229 | B1* | 7/2016 | Kahn | G06F 19/00 |
| 10,045,131 | B2* | 8/2018 | Bryant | H04R 25/55 |
| 2004/0264719 | A1* | 12/2004 | Naylor | H04R 25/70 |
| | | | | 381/314 |
| 2011/0235835 | A1 | 9/2011 | Bülow et al. | |
| 2012/0051569 | A1 | 3/2012 | Blamey et al. | |
| 2012/0183165 | A1* | 7/2012 | Foo | H04R 25/50 |
| | | | | 381/314 |
| 2012/0189130 | A1 | 7/2012 | Lee et al. | |

(Continued)

FOREIGN PATENT DOCUMENTS

| CA | 2399929 A1 | 4/2000 |
| DE | 102007035175 A1 | 2/2009 |

(Continued)

OTHER PUBLICATIONS

Aishwarya Padmakumar et al., "Extractive Text Summarization using Latent Semantic Analysis", Natural Language Processing (Fall 2014)—Project, Oct. 31, 2014 (Oct. 31, 2014), XP055407826, found on the Internet on Sep. 19, 2017, URL:https://www.cs.utexas.edu/~aish/iitm/NLPProject.pdf.

*Primary Examiner* — Brian L Albertalli
(74) *Attorney, Agent, or Firm* — Laurence A. Greenberg; Werner H. Stemer; Ralph E. Locher

(57) ABSTRACT

A method facilitates the ascertainment of parameter values of a hearing aid for a user-specific auditory situation. For that purpose, blog entries from a wearer of a hearing aid are evaluated in automated fashion and the evaluation is taken as a basis for determining adapted parameter values.

13 Claims, 2 Drawing Sheets

(56) References Cited

U.S. PATENT DOCUMENTS

| | | | | |
|---|---|---|---|---|
| 2013/0251179 A1* | 9/2013 | Aschoff | ................... | G06F 8/31 |
| | | | | 381/314 |
| 2013/0297536 A1* | 11/2013 | Almosni | ................ | G16H 50/20 |
| | | | | 706/12 |
| 2018/0181719 A1* | 6/2018 | Balian | ................... | G06Q 50/01 |

FOREIGN PATENT DOCUMENTS

| | | | |
|---|---|---|---|
| DE | 102009043775 | A1 | 4/2011 |
| EP | 2595415 | A1 | 5/2013 |

* cited by examiner

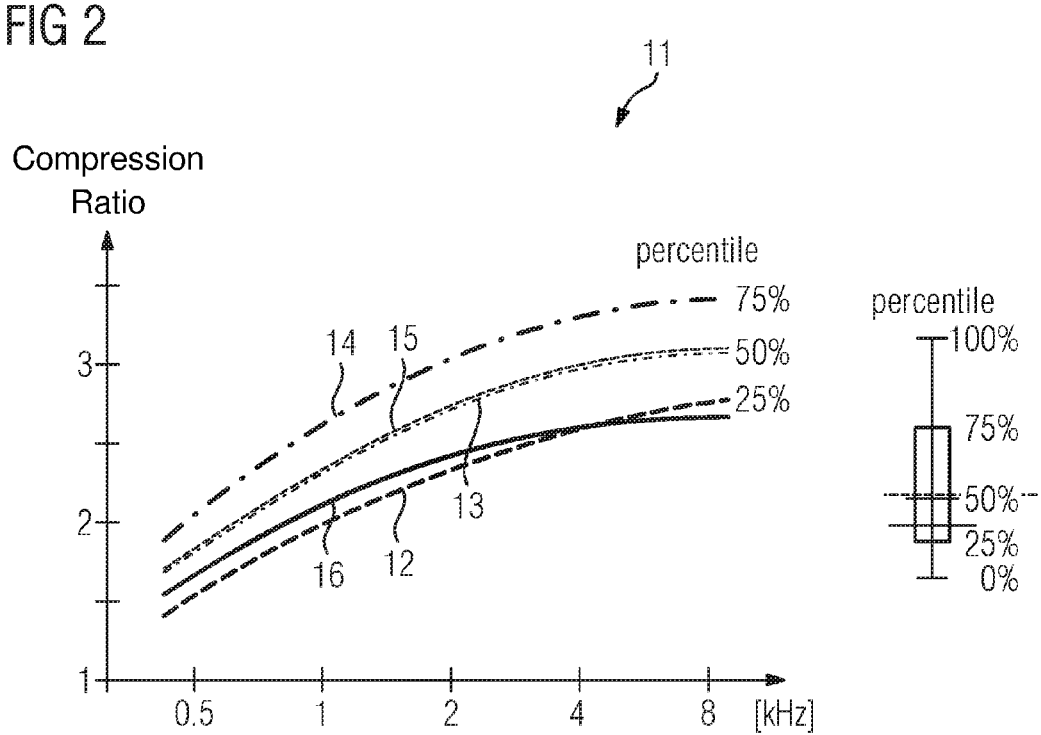

METHOD FOR THE AUTOMATED ASCERTAINMENT OF PARAMETER VALUES FOR A HEARING AID

CROSS-REFERENCE TO RELATED APPLICATION

This application claims the priority, under 35 U.S.C. § 119, of German application DE 10 2016 209 329.0, filed May 30, 2016; the prior application is herewith incorporated by reference in its entirety.

BACKGROUND OF THE INVENTION

Field of the Invention

Hearing aids are portable hearing apparatuses that are used for caring for the hard of hearing. Hearing aids conventionally referred to as "hearing devices" are provided for the hard of hearing suffering from hearing loss in the medical sense. In order to meet the numerous individual needs of these persons, different designs of hearing aids are provided, such as behind-the-ear hearing devices (BTE), hearing devices with an external receiver (RIC, Receiver in the Canal), in-the-ear hearing devices (ITE), or perhaps concha hearing devices or channel hearing devices (ITE, CIC). The hearing devices listed by way of example are worn on the external ear or in the auditory canal. Furthermore, bone-conduction hearing aids, implantable hearing aids or vibrotactile hearing aids are also commercially available. In these, the damaged hearing is stimulated either mechanically or electrically.

Recently, there are, in addition to the conventional hearing devices described above, hearing aids for assisting persons with normal hearing, also called "personal sound amplification products" or "personal sound amplification devices." These hearing aids are not provided for compensating for hearing losses—attempting this could possibly even damage the hearing—but rather are used for assistance in specific or difficult auditory situations.

By way of example, such hearing aids can be used for assisting hunters on a hunt who want to hear specifically prey, or perhaps when observing birds. Further, such hearing aids are used for assisting speech intelligibility in what are known as "cocktail party" situations, for example; for sports reporters wanting to telephone in a stadium, or for violinists wanting to damp spectrally pure violin tones during practice in order to reduce constant strain on their hearing.

Regardless of their wearer, hearing aids in principle have an input transducer, an amplifier and an output transducer as essential components. The input transducer used is normally an acoustoelectric transducer, for example a microphone, and/or an electromagnetic receiver, for example an induction coil. The output transducer is in most cases produced as an electroacoustic transducer, for example as a miniature loudspeaker, or as an electromechanical transducer, such as a bone-conduction receiver. The amplifier is usually integrated in a signal processing device.

Hearing aids are equipped by the respective manufacturers with very extensive processing mechanisms for acoustic signal processing. In this case, the values of a multiplicity of parameters can be used to adjust the extensive details of various signal processing characteristics, such as, by way of example, gain, dynamic compression, for the directional microphone, the raising of the spectral range of voice, feedback rejection and the rejection of interference (for example inherent noise in the microphones or wind noise).

The parameterizability of modern hearing systems, that is to say both of conventional hearing devices and of hearing aids for normally hearing people, has, with several thousand parameters, already pushed forward into the area of medical large systems such as computed tomography scanners or MRI scanners, for example. The majority of these parameters are usefully now adjustable only by the manufacturer of the hearing systems, but can critically influence the auditory quality perceived by the wearer of the respective hearing aid. Only a small proportion of the parameter values, such as the gain or a tonal balance for emphasizing high and/or low sounds, for example, is actually comprehensible to and usefully adjustable by the hard of hearing.

Usually, the parameters of a hearing aid are adapted specifically for the respective user, that is to say the hearing aid wearer, by a hearing device acoustician ("HCP", Hearing Care Professional) in a process, what is known as "fitting." This involves measurements of the hearing of the hearing aid wearer, so-called audiograms, being taken as a basis and the acoustic characteristics of the hearing aid being taken into consideration in order to adjust the latter such that the result for the wearer is the greatest possible clarity of conversations and the most natural possible auditory impression.

One-off adaptation of a hearing aid to the hearing of the person that is hard of hearing is usually insufficient to adjust the hearing aid for everyday use too, however. Everyday auditory situations cannot be extensively recreated on the premises of the acoustician at which the person who is hard of hearing gets his hearing device. Many people who are hard of hearing who wear a hearing device go to an acoustician three to four times on average after the initial fitting of their hearing device in order to have further readjustments made. In some cases, even more frequent visits of up to eight times are also necessary.

In addition, a person who is hard of hearing, particularly if he has already had hearing difficulties for a relatively long time before he is equipped with a hearing device, needs to relearn to hear and above all to understand speech to some extent since the brain forgets capabilities in a phase of relatively long absence of use, which also applies to the capability of understanding speech. This is particularly true of people with impaired hearing due to age who have hearing difficulties for years before being taken to an acoustician with the assistance of family members.

To facilitate the fitting of hearing devices, and to reduce the frequency of fitting sessions that are necessary at an acoustician, it is now possible to resort to Internet-based technologies. The use of Internet-based platforms, that is to say social networks, Internet forums and webblogs is now widespread. Young people, in particular, integrate these into their everyday life, of course. A weblog, or a blog for short, is a journal that is managed on a website on the Internet, and is therefore in most cases visible to the public, and is used as a medium for presenting aspects of one's own life and opinions on specific topics in public, for example. The blog entries, also called postings, blog postings or posts, are the articles in text form that represent the main constituents of the respective weblog.

The key word "Web 2.0" describes how today's Internet user changes from a 'consumer' to a 'prosumer', that is to say does not just consume data but also produces data. The spread of such information technologies also opens up increasing options in the supply of and care with medical products and services.

It is thus now a simple matter to record and evaluate environment-related and/or person-related data in order to gain knowledge of the life circumstances of the respective user. Health issues, in particular, are increasingly of interest in this case. User-specific data are recorded using devices that use sensors to record body functions or perhaps environment data, for example. These data can then be made available on an applicable Internet-based platform, for example, and/or logged in a blog by the user independently.

Alternatively, user-specific data of this kind can be forwarded directly to applicable databases and evaluated therein. The results can be used to create a health profile, to monitor nutrition or for fitness control, for example. Patients will in future actively demand which data can and should be evaluated through them far more. Above all, when better approaches to therapy are expected therefrom.

For wearers of hearing aids too—regardless of whether they wear "conventional" hearing devices as people who are hard of hearing or use a hearing aid just for targeted assistance in specific auditory situations as normally hearing people—Internet-based technologies of this kind and the applicable platforms provide useful options. The increasing spread thereof makes novel solution concepts possible. The person who is hard of hearing and the acoustician do not necessarily have to be at the same location for the purpose of adjusting a hearing device.

Instead, they may be equipped with Internet-compatible programs and devices, such as, by way of example, apps that are executed on what are known as 'mobile devices' such as smartphones. It is entirely possible for both an initial fitting and any follow-up fittings that are necessary to take place when the person who is hard of hearing and the acoustician are physically separate.

In addition, there is an increasing spread of what are known as "cloud" technologies: providers of software technologies, such as Amazon or Microsoft, for example, are increasingly setting up large computer centers and offering manufacturers of sector-specific software products to position ("host") their solutions in the computer centers in return for a type of rental fee. Therefore, manufacturers of software systems for the purpose of fitting hearing systems also have computer centers available on which they can provide parts of their specifically developed software systems as what is known as a "back end". These parts are then usable via Internet connections for the "front end" parts, that is to say the parts of the software system that run on mobile terminals such as smartphones.

Sector-specific software systems of this kind are usually split in a suitable fashion. Computation-intensive solution algorithms or even databases that deal with extensive volumes of data are positioned in the backend. Commonly, the backend is also used to provide options for downloading software programs, so that they can be obtained from the mobile terminals and executed thereon.

By contrast, the front end parts of the software system undertake tasks that require user interaction and provide an applicable user interface, also called an MMI ("man machine interface"). A familiar term in this context is "apps" (applications), which are used on smartphones.

Parameters of a hearing aid can be adapted using prescribed Internet-based technologies, for example using formalized input options, that is to say input options using a previously defined input mask. This involves the use of mostly popular fitting programs for the applicable hearing aids or perhaps html/web forms that implement a catalog of questions with predefined selection options. The inputs made by a wearer of a hearing aid can then be supplied to further processing and used for adapting parameter values of the hearing aid.

However, the predefined selection options mean that such formalized input options do not allow every user-specific auditory situation to be captured in detail. Accordingly, subjective auditory perceptions of a hearing aid wearer can be taken into consideration only to a limited extent.

Canadian published patent application CA 2 399 929 A1, corresponding to U.S. Pat. No. 7,283,842 (and progeny), discloses a fitting system for a hearing device and a corresponding method for adapting a hearing device to the needs of an individual. The fitting system comprises an input apparatus that is connected to a control unit on the hearing device by means of a cable and/or by means of a wireless link. The input apparatus used is a mobile phone that can be used to transmit user-specific data to a server manually or by voice and to make modifications and changes to hearing device parameters from said server.

Commonly assigned German published patent application DE 10 2009 043 775 A1 discloses a method for adjusting a hearing apparatus and particularly a hearing device and/or tinnitus masker in which a voice signal from a user is captured and identified, the voice signal is analyzed in order to identify an emotional state of the user, and at least one parameter of the hearing apparatus is adjusted on the basis of the identified emotional state. In this case, the present emotional state is established on the basis of a voice signal emanating from the user, which, in accordance with DE 10 2009 043 775 A1, involves resorting to known algorithms for voice analysis.

Commonly assigned German published patent application DE 10 2007 035 175 A1 discloses a method for collecting individual auditory situation data from a user of a hearing apparatus by virtue of a recording device being worn by the user in an individual auditory situation, measurement data relating to the auditory situation being collected by the recording device and data being recorded by the recording device. To this end, a perceptive model is implemented in the recording device in order to collect psychoacoustic data from the measurement data, the psychoacoustic data being recorded by the recording device.

BRIEF SUMMARY OF THE INVENTION

It is accordingly an object of the invention to provide a method for automatically parameterizing a hearing aid which overcomes the above-mentioned and other disadvantages of the heretofore-known devices and methods of this general type and which allows optimum parameter values of a hearing device to be ascertained that are associated with a specific auditory situation.

With the foregoing and other objects in view there is provided, in accordance with the invention, a method of automatically ascertaining parameter values of a hearing aid, the method comprising:

carrying out a computer-linguistic analysis by analyzing a user-specific blog entry in a weblog on a computer-linguistic basis;

reducing results of the computer-linguistic analysis to such results as are directed to a subjective auditory perception of a user of the hearing aid;

associating the reduced results directed to the subjective auditory perception of the user with a specific auditory situation;

extracting user-specific desired changes from the reduced results directed to the subjective auditory perception of the user; and taking the user-specific desired changes for the specific auditory situation as a basis for ascertaining adaptive parameter values, and offering the adaptive parameter values to the user or an audiologist for adapting parameter values of the hearing aid that are associated with the specific auditory situation.

In other words, the objects of the invention are achieved according to the invention by a method for the automated ascertainment of parameter values for a hearing aid, wherein a user-specific blog entry in a weblog is analyzed on a computer-linguistic basis, wherein the results of the computer-linguistic analysis are reduced to such results as are directed to the subjective auditory perception of the user, wherein the reduced results directed to the subjective auditory perception of the user are associated with a specific auditory situation, wherein user-specific desired changes are extracted from the reduced results directed to the subjective auditory perception of the user, and wherein the user-specific desired changes for the specific auditory situation are taken as a basis for ascertaining adapted parameter values that are offered to the user for adapting parameter values of the hearing aid that are associated with the specific auditory situation.

In a first step, the invention is based on the fact that particularly weblogs and the corresponding blog entries are fundamentally a good basis for person-specific data collection on account of the large amount of user-specific information possibly contained. When using a blog that is concerned with health issues, there is thus the possibility of drawing conclusions about the state of health of the respective author. However, such blog entries are not immediately suitable for automated further processing of the data, since blog entries are written in continuous text or plain text, that is to say in free text.

In a second step, the invention sets out from the consideration that continuous texts could be evaluated by means of conventional voice analysis. The reason is that voice analysis can be used to filter out content and relationships of an underlying text. In the case of Internet pages too, it is possible to resort to such voice analyses in order to automatically ascertain key words in texts, to capture moods and discussions, to identify names of persons and also to automatically classify documents and associate them with particular subject areas. Accordingly, this also allows weblogs to be analyzed linguistically.

In a third step, the invention now combines these two facts in order to collect user-specific data from a weblog or a corresponding blog entry by subjecting said weblog or blog entry to a computer-linguistic analysis. On the basis of the user-specific data, it is possible to ascertain proposals or measures that are used directly for handling a medical issue, for example. For a blogging wearer of a hearing aid, this means that, when writing a blog entry, he can provide data that log his auditory impressions or auditory perceptions in different life situations. These entries are then evaluated specifically for the respective wearer of the hearing aid by means of the computer-linguistic analysis.

The results of the computer-linguistic analysis are reduced to results that are directed to the subjective auditory perception of the user. The reduced results are finally associated with a specific auditory situation, that is to say an auditory intention, and user-specific desired changes are extracted from the reduced results. The user-specific desired changes, which expediently render complaints or desires relating to the auditory situation, are preferably available in a formalized fashion.

On the basis of the extracted user-specific desired changes, parameter values adapted to the specific auditory situation—that is to say proposed improvements—are ascertained that are offered to the user for the purpose of adapting parameter values of the hearing device that are associated with the specific auditory situation.

The method therefore allows blog entries to be used to ascertain changed parameter values of a hearing aid that are oriented to the desires of the respective hearing aid wearer. The blog entry of a wearer is no longer just used to communicate with the surroundings, but rather can be evaluated quite specifically in respect of possible proposed improvements for the fine adjustment ("follow-up fittings") of his hearing device in a specific auditory situation by virtue of the computer-linguistic analysis. The method is performed fully automatically, in particular.

As a further preference, the parameter values adapted to the specific auditory situation are ascertained on the basis of computation algorithms. The input data used for the computation algorithms are, preferably in addition to the user-specific desired changes and the current parameter values, the data from medical findings for the user. Typical findings are data directed at the hearing, for example, but also age, gender or mother tongue.

The advantage of taking into consideration medical findings can be clarified on the basis of a comparison between a slight and a severe loss of hearing. The range of adjustment for the gain is smaller for a person with a great loss of hearing, since the remaining difference up to the threshold of discomfort is smaller. Raising or lowering of the gain that is performed for a particular purpose must therefore be performed at shorter intervals for a person with a great loss of hearing than for a person with a slight loss of hearing.

In this context, a specific auditory situation is understood to mean a classifiable auditory situation, that is to say a situation that can be associated with a typical everyday auditory situation as related. When the hearing aid wearer is in a particular auditory environment, multiple situations can arise in this auditory environment in which the wearer wants an altered auditory perception.

Examples of conventional auditory environments are a relaxation room, road traffic, a restaurant (this often has the typical "cocktail party situation"), a concert hall, etc. The auditory situations typically have auditory intentions associated with or superimposed on them that are known for the process of subjective hearing. Examples of such auditory intentions are speech intelligibility, music enjoyment, directional hearing, suppression of wind noise or the like. Particularly such intentions and/or auditory situations can be analyzed from a text entry by means of a computer-linguistic analysis and presented as a result.

The parameter values adapted to the specific auditory situation are preferably offered to the wearer of the hearing aid himself for the purpose of programming his hearing device. He then has the choice of either adopting or rejecting the corresponding proposals.

As a further preference, the adapted parameter values are made available to a hearing device acoustician. The hearing device acoustician can then discuss the adapted parameter values together with the wearer of the applicable hearing aid as part of a consultation session and/or a fitting session, can evaluate them and can then—following further adaptation if need be—transfer them to the hearing aid. It goes without saying that it is also possible for the wearer to adopt the applicable proposals first and additionally to visit a hearing device acoustician in order to make further adaptations and changes if need be. In a fully automated alternative, the ascertained and adapted parameters values are transferred directly to the hearing aid of the user.

In an advantageous configuration of the invention, the creation of the user-specific blog entry involves the parameter values of the hearing aid that are associated with the blog entry being stored. The parameter values stored for the hearing aid are thus the parameters that are or were originally set in the hearing aid at the time of a situation described in the blog entry, that is to say the auditory situation experienced.

As a particular preference, the creation of the blog entry involves the current parameter values of the hearing device being stored. The current parameter values are preferably stored immediately. If the blog entry is written immediately at the time of a particular situation being experienced, then the current parameter values are taken as a basis, stored and used further. Since the parameter values represent the signal processing characteristics of the hearing device, they can then be adapted by means of suitable proposed changes during subsequent further use.

In particular, the wearer of the hearing aid has the option of creating a blog entry with a time delay in relation to the auditory situation. In this case, the parameter values and the blog entry are captured in two separate steps. To allow the blogging hearing aid wearer to achieve this, it is sufficient for the mobile device used for creating the blog entry, such as a smartphone, to be equipped with an applicable piece of software. Such a piece of software is preferably designed so that a simple user input, such as the operation of a single key and/or key combination or perhaps a swipe gesture on the display of a smartphone, is used to provide the parameter values with a time stamp as a marker, to obtain the current parameter values of the hearing aid at the same time and to store said parameter values for later use.

As a further preference, it is possible for the wearer of the hearing aid to activate an operator control element on the hearing aid and to provide the parameter values with a time stamp or an applicable marker as result, for example by pushing a button. When the hearing system wearer then writes his blog entry at a later time, he can refer to this time stamp and adopt the one applicable reference to the time stamp in his blog entry, for example in the form of an applicable link, that is to say as a reference.

In an additionally advantageous configuration of the invention, the method allows the wearer to be assisted in respect of the acoustic recording of ambient sounds, in which auditory situations that the wearer wishes to improve likewise occur. Preferably, this is accomplished by using the microphones of the hearing aid, since these—in contrast to the microphone of the smartphone that is used, for example—are usually always in an optimum position. Preferably, the or each microphone of the hearing aid is used to record the ambient sound continuously in a ring memory. The ring memory expediently keeps the respective current audio recording, or the recording. In this case, as soon as the storage capacity of the ring memory is exhausted, the oldest recording in each case is expediently discarded and replaced by a new recording that arrives.

When a blog entry is written with a time delay in relation to an auditory situation, a copy of the ring memory is preferably automatically stored and used for later use, for example for documentation purposes in the course of a fitting session by an advising hearing device acoustician. As a further preference, when the blog entry is written on a deferred basis, production of the time stamp is used not only for storing the current parameter values but also for storing the audio recording.

In an additionally advantageous embodiment, only the parameter values that are alterable by the wearer of the respective hearing aid are stored. In other words, not all parameter values of a hearing system are stored when a blog entry is created. This applies particularly to the parameter values that are usefully alterable only by the manufacturer of the hearing system or of the hearing aid. These parameter values have expediently already been entered into an applicable patient database, and stored therein in an appropriately retrievable form, initially when the hearing aid was handed over to the wearer. In modern hearing systems that comprise several thousand parameters, only a very small proportion of which is alterable by the hearing system wearer, this is a significant reduction in the volume of data for the parameter values that are to be transferred.

Preferably, the blog entry and the parameter values of the hearing aid that are associated with the blog entry are transferred to a backend system. By way of example, a backend system is understood to mean a system stationed in a cloud or a cloud computing center. A cloud provides a user with IT infrastructures, such as computation capacity, data memory, network capacities or perhaps finished software via the Internet without these having to be installed on the local computer. As a particular preference, the transfer via the backend system is made to an audiological technical division of the respective hearing device manufacturer. The audiological technical division is therefore provided with the parameter values of the hearing aid.

In order to ensure that the parameter values of the hearing device that are associated with the blog entry are always transferred to the backend system, it is advantageous if the parameter values of the hearing aid are provided with a time stamp. As such, each of the appropriate parameter values of the hearing device can be associated with a written blog entry and these can be transferred to the backend system together.

In an advantageous configuration, parameter values associated with the auditory situation are transferred to the backend system automatically. In an alternatively preferred configuration, the parameter values associated with the auditory situation are transferred to the backend system by the wearer of the hearing aid. As a particular preference, only the parameter values of the hearing device that have been changed by the hearing aid wearer are transferred to the backend system in this case.

Expediently, the transfer of the blog entry and of the parameter values of the hearing aid that are associated with the blog entry to the backend system is preceded by ascertainment of whether a blog entry describing an auditory situation is involved. If the blog entry describes a situation that is not relevant to the auditory perception of the wearer of the hearing aid, then the blog entry is not analyzed further.

If the blog entry is a blog entry describing an auditory situation, then it is evaluated together with the applicable parameter values of the hearing device.

The ascertainment of whether a blog entry describing an auditory situation is involved preferably likewise takes place on the basis of a linguistic analysis. A particular advantage is a parts of speech ("PoS") analysis, in which the words are traced back to their basic form. These basic forms are then compared with a catalog of words and the relevance of the blog entry to a user-specific auditory perception is ascertained therefrom as appropriate.

To ascertain parameter values adapted to the specific auditory situation, the extracted user-specific desired changes are, as a further preference, compared with proposed changes that are stored in a proposal system and that have associated applicable parameter values for a hearing aid. To this end, preferably every result of the computer-linguistic analysis that describes a subjective auditory perception of a user is associated with a catalog entry of auditory situations and/or auditory intentions. The catalog of auditory situations and/or auditory intentions is in this case expediently a directory that comprises auditory situations and/or auditory intentions as described above.

In an additionally preferred configuration of the invention, parameter values adapted to the specific auditory situation are ascertained by using a proposal system comprising a patient database. The patient database preferably contains parameter values that have been used for fitting the hearing aids of other wearers. The ascertainment expediently takes into consideration the parameter values of hearing devices of other patients having the same or similar characteristics, such as loss of hearing, mental fitness or personal preferences, for example. The ascertainment can thus be based on comparisons with computations of parameter values matching a specific auditory situation that have already taken place in the past.

Additionally, the comparison of the user-specific desired changes with the proposed changes stored in the proposal system expediently additionally involves the parameter values of the hearing device that are associated with the blog entry being taken into consideration.

A further advantage is when the parameter values of the hearing device that are associated with the blog entry and/or the adapted parameter values of the hearing device are visualized. The visualization preferably contains indications of how other wearers have already been assisted in a similar auditory situation and, by way of example, with a comparable loss of hearing, and also similar interests and cognitive capabilities, using appropriate settings for their hearing aids.

The computer-linguistic analysis usually comprises a syntactic analysis, a semantic analysis and/or a contextual analysis of the text to be analyzed. Preferably, the computer-linguistic analysis involves the sentence structure of the blog entry being analyzed. This is a syntactic analysis in which the blog entry is analyzed in respect of the structuring of the sentences and the sentence types. The sentence types identified are particularly statement sentences, question sentences and command sentences. In this context, the syntactics describes the rules according to which the language constructs are formed. The respective sentence components (subject, verb, object, adverb, adjective) are then analyzed in respect of their relevance to auditory perception and possible negative emotional associations.

As a further preference, the computer-linguistic analysis involves the content of the blog entry being analyzed. This is the semantic analysis that is performed on the basis of the syntactic analysis. Semantics describes the meaning of the language constructs. The content of a text is ascertained by virtue of the semantic content of one or more words being analyzed. This also includes analysis of the relationships between words of a language, and the relationship between a word and an object. It is likewise advantageous if the computer-linguistic analysis involves the context of the blog entry being analyzed.

In an additionally advantageous configuration of the invention, a weblog is captured in the form of audio signals, particularly in the form of voice signals. In other words, the invention involves the spoken language of a user and/or his environment being identified and captured. To this end, a user can immediately record his situation-related impressions by means of a piece of voice recognition software when he actually experiences a situation, for example. From the captured audio signals (voice signals), user-specific desired changes are then likewise extracted and used as a basis to ascertain parameter values adapted to a specific auditory situation, which parameter values are offered to the user for the purpose of adapting parameter values of the hearing aid that are associated with the specific auditory situation.

In order to allow applicable evaluation of the captured audio signals, they are preferably processed by means of a voice processing module. In the voice processing module, the speech in the audio signal is converted into text information. This text information is then analyzed on a computer-linguistic basis and, as prescribed, processed further for the purpose of ascertaining parameter values adapted to a specific auditory situation.

In particular, the method according to the present invention also allows text information to be captured from video files containing audio signals, and the text information then to be analyzed and processed further according to the invention.

Other features which are considered as characteristic for the invention are set forth in the appended claims.

Although the invention is illustrated and described herein as embodied in a method for the automated ascertainment of parameter values for a hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a graph showing a comparative plot of parameter values of a hearing device that are current at the time of the auditory situation described in a blog entry with parameter values that are proposed for adaptation.

DETAILED DESCRIPTION OF THE INVENTION

Figure 1:
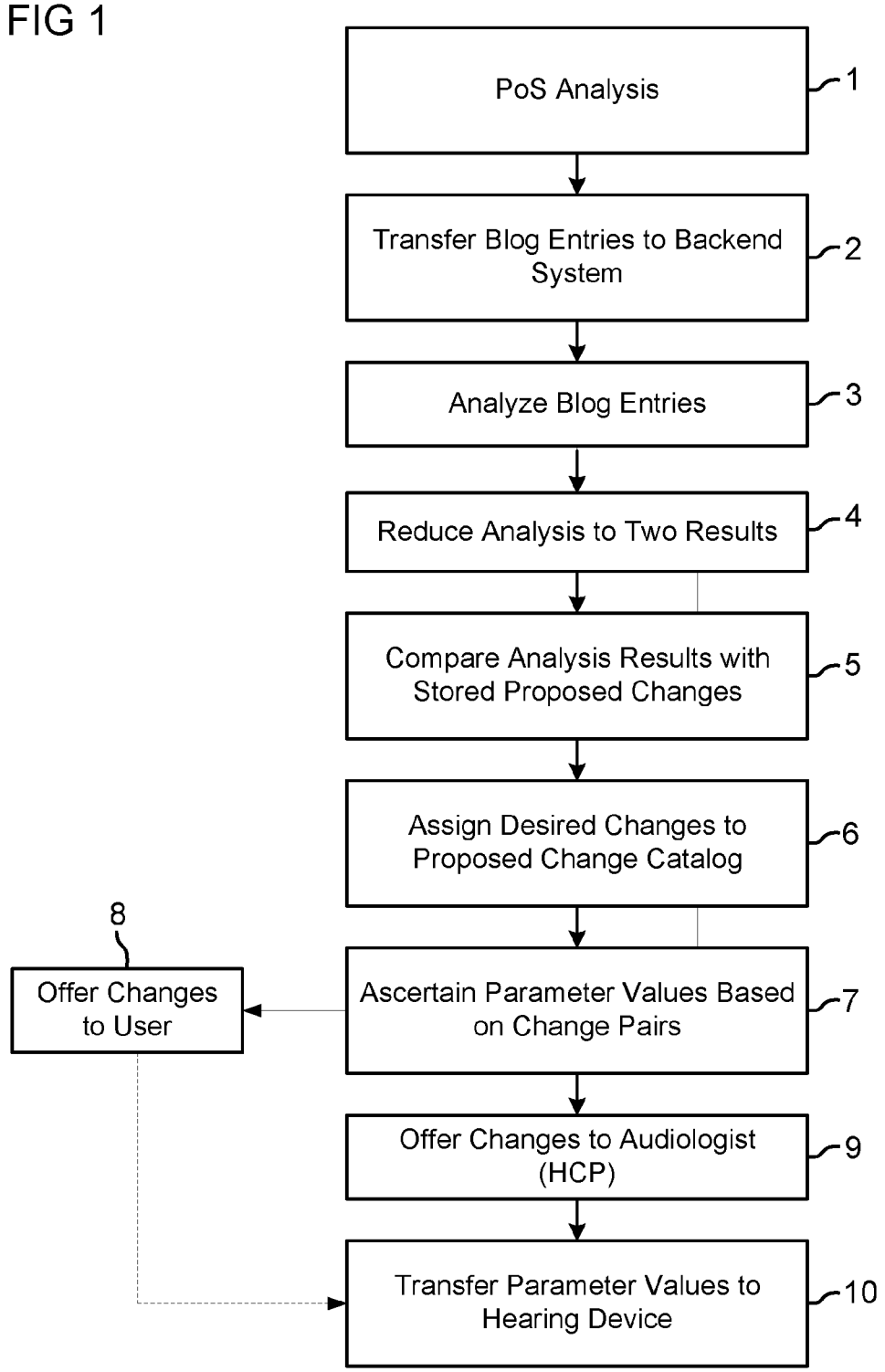
FIG. 1 is a flow chart showing a sequence of method steps for the automated ascertainment of parameter values for a hearing device.

Referring now to the figures of the drawing in detail and first, particularly, to FIG. 1 thereof, there is shown a sequence of method steps for ascertaining parameter values for a hearing device. In the present case, the method is based on a weblog having four blog entries from a hearing device wearer that said hearing device wearer has written using an Internet-compatible smartphone, for example. The blog entries describe everyday situations of the hearing device wearer and are written in continuous text. The method can now be used to ascertain, in automated fashion, on the basis of the blog entries of the hearing device wearer, parameter values for the hearing aid that are optimized in respect of a particular user-specific auditory situation.

At the beginning, it is ascertained whether the blog entries are blog entries that are relevant to auditory perception (step 1). This is accomplished by means of a parts-of-speech ('PoS') analysis in which the words are traced back to their basic form. These basic forms are then compared with a catalog of words, and the relevance of the blog entry to user-specific auditory perception is ascertained therefrom as appropriate. If the post is not relevant, then it is not analyzed further.

If the blog entries are relevant to the auditory perception of the hearing device wearer, then they are transferred together with their associated parameter values of the hearing device to a backend system, in the present case to a proposal system running on a server or in a cloud (step 2). In the backend system, the user-specific blog entries are then analyzed on a computer-linguistic basis (step 3).

A weblog of a hearing device wearer can contain the following temporally successive blog entries, for example:

Blog entry 1—Tuesday, Aug. 25, 2015, 18:08 hours:
"Was out shopping with my sweetheart today. So much that I can hear all around now. Probably need to get used to the many impressions first."

Blog entry 2—Wednesday, Aug. 26, 2015, 11:26 hours:
"Sometimes the hearing devices are a little irritating. While washing the dishes this morning, it was fairly unpleasant when the crockery clashed together."

Blog entry 3—Friday, Aug. 28, 2015, 21:46 hours:
"We were able to enjoy a wonderful sunset on the terrace today at our evening meal. The new hearing devices are doing quite well. Still had a few difficulties in understanding Hartmut among all the others. Have recorded 10 minutes as an example to demonstrate it to my hearing device acoustician."

Blog entry 4—Saturday, Aug. 29, 2015, 19:13 hours:
"Can now hear far more than before. Even over a cup of coffee this afternoon. Sometimes I can hear too much, for example when a spoon hits a coffee cup. That was almost painful."

From these blog entries, it is possible to obtain information about the subjective auditory sensation of the hearing device wearer by means of a computer-linguistic analysis. A syntactic analysis involves the blog entries being examined in respect of the structure of the sentences and the sentence types. The sentence types identified are particularly statement sentences, question sentences and command sentences. The respective sentence components (subject, verb, object, adverb, adjective) are then analyzed in respect of their relevance to auditory perception and possible negative emotional associations.

In blog entry 1, the hearing device wearer is generally describing the situation while shopping. There are no positive and/or negative emotions or audiologically relevant content evident here, and the blog entry is not subjected to a computer-linguistic analysis.

In the second blog entry, on the other hand, the hearing device wearer describes an undesirable auditory situation of audiological relevance. This blog entry is subjected to a computer-linguistic analysis. It becomes clear that the hearing device wearer feels troubled by the backdrop of sounds while doing the dishes ("irritating, unpleasant"). These negative feelings are related to the "clashing together" of the "crockery", and to the hearing devices of the author.

Blog entry 3 likewise describes negative perceptions of the hearing device wearer in a further auditory situation experienced by the hearing device wearer. It is evident from this third entry that the hearing device wearer clearly could not always understand his/her interlocutor Hartmut correctly, since the ambient sounds ("among all the others") were evidently too loud. He/she therefore wishes to play a recording of the conversation to his/her hearing device acoustician (also referred to as "audiologist"). Such a recording can then be taken into consideration when ascertaining adapted hearing device parameters.

The subsequent blog entry 4 shows that an improvement to auditory perception was clearly able to be achieved following the visit to the audiologist. However, this auditory perception now appears to be so good that the hearing device wearer feels troubled again ("hear too much", "spoon", "coffee cup", "hit").

On the basis of the syntactic analysis of the blog entries, a semantic analysis takes place. The semantic analysis involves the result of the syntactic analysis, particularly the relationships among the words, being analyzed for the perceptions and desires of the user. The result obtained is then that the user had a positive perception, for example, which is evident from the relationship between "sunset" and "enjoyed". This perception has no connection with the auditory perception of the wearer of the hearing aid, however, and is accordingly not analyzed further.

The relationships between the words "difficulties" and "understanding Hartmut", and also between "unpleasant" and "crockery clashing together" and between "too much" and "spoon hits", on the other hand, provide an indication that the author had negative perceptions that are linked to his/her auditory perception, which means that a compensating measure should be found for him/her. In terms of content, the complaints regarding auditory sensation are synonymous with intentions concerning hearing, that is to say with auditory intentions:

Hartmut (proper name) is a person who needs to be understood better (speech intelligibility). The sound of crockery clashing together needs to be reduced. The sound impulses that emanate from spoons hitting need to be eliminated. Further, the semantic analysis can be used to extract directly formulated desires for auditory sensation. As such, from a blog entry "I wish I could hear the bass better at the concert", for example, it is possible to obtain the word combination "bass" and "hear better"—which is likewise the auditory intention.

The results of the computer-linguistic analysis and particularly the results of the semantic analysis are now reduced to two results that are directed at the subjective auditory perception of the hearing system wearer (step 4).

The results are thus filtered to obtain results that are relevant to the subjective hearing of the hearing system wearer. In the blog entries described by way of example, the component about perception of the sunset (blog entry 3) would thus be filtered out, since this perception has nothing to do with hearing. The results filtered out therefore describe the subjective auditory perception or the auditory intention of the hearing system wearer.

For the reduced results directed at the subjective auditory perception of the hearing device wearer, user-specific change measures are now obtained that specifically take into consideration the desires and/or complaints of the hearing system wearer.

To this end, the reduced results of the computer-linguistic analysis that are directed at the subjective auditory perception of the hearing device wearer are compared with proposed changes, stored in a proposal system, that have associated applicable parameter values for a hearing aid (step 5). To this end, the proposal system comprises a patient database that stores, as proposed changes, parameter values that have been used for fitting the hearing devices of other hearing device wearers in corresponding auditory situations.

These are, by way of example, catalog entries of auditory intentions, that is to say a directory of intentions that are known or common for the process of subjective hearing. The auditory intentions taken into consideration are speech intelligibility, music enjoyment, directional hearing and suppression of wind noise, for example. The catalog preferably also comprises parameter values that are associated with ambient sounds. Examples in this regard are situations in road traffic, at cocktail parties, at the movies, in front of the television, in a concert hall, outdoors, on the telephone or in the car. Preferably, information about the acoustic background is also included in the catalog, such as the verberation or volume and type of ambient sound, such as music, voices, noise from motors, machines, vehicles and the like, for example.

The proposal system is therefore used as a comparison database when ascertaining changed parameter values, in order to compare the reduced results of the computer-linguistic analysis that are directed at the subjective auditory perception of the hearing device wearer with computations that have already taken place in the past and are now stored.

Every user-specific desired change—extracted from the reduced results directed at the subjective auditory perception of the user—is now assigned a corresponding catalog entry, that is to say a proposed change, that corresponds to the user-specific desired change (step 6). With reference to the blog entries described above, the catalog entries stored in the proposal system are the "clashing together of crockery", the "understanding of a person" and "spoons hitting". According to blog entry 2, it becomes clear that the clashing together of the crockery is unpleasant to the hearing device wearer, for example. This result is now assigned to the catalog entry "clashing together of crockery".

For the parameter values adapted to the specific auditory situation are then ascertained—by including the results from the semantic analysis and the context analysis—for every obtained pair of a user-specific desired change and a catalog entry (step 7). These adapted parameter values then correspond to the user-specific desired changes of the hearing device wearer.

The new set of parameters, that is to say the parameter values for the hearing device that are adapted to the respective auditory situation on the basis of the user-specific desired changes, are offered either to the hearing device wearer (step 8) and/or to a hearing device acoustician in charge (step 9) for further use or exploitation. If the adapted parameter values are offered to the wearer for programming into his hearing aid, then he has the option of either adopting or discarding the relevant proposals.

Alternatively, the adapted parameter values can also be ascertained as described below. In addition to the auditory intention and the current parameter values, it is possible to evaluate findings data for the user. These computation algorithms use findings data for the hearing aid wearer, parameter values and user-specific desired changes as input data.

The newly proposed parameter values are thus ascertained by means of computation algorithms designed by the hearing aid manufacturer that now additionally include the findings data for the patient. The computation algorithms are stored particularly in the proposal system. This means that the results are distinguished according to user characteristics, so that, by way of example, a different frequency shape can be provided for people with Italian as their mother tongue than for people with German as their mother tongue for speech intelligibility.

Fundamentally, besides loss of hearing (as a generally known and most essential feature) or a classification of loss of hearing, a wide variety of findings features such as age, sex, a coefficient for metal fitness, blood pressure values, the information regarding whether the mother tongue is what is known as a "tonal" language (e.g. Chinese), are considered.

At a consultation session and/or a fitting session with a hearing device acoustician (HCP, hearing care professional), the hearing device acoustician has the previously collected data available, that is to say the weblog or the blog entry (entries) of the hearing device wearer, the parameter values of the hearing device that were current at the time of the auditory situation experienced and the adapted parameter values computed by means of the proposal system.

The parameter values of the hearing device that were current at the time of the auditory situation experienced and also the adapted parameter values are additionally visualized for the hearing device acoustician. In this context, the visualization contains particularly indications of how other hearing device wearers with a comparable loss of hearing and, by way of example, comparable interests and cognitive capabilities to which this auditory intention is relevant have already been assisted with appropriate hearing device settings.

The hearing device acoustician is then provided with the option of adopting or remodifying, and only then adopting, the newly adapted proposal values. In this case, he can incorporate his own professional experience, his appraisal of the impressions of the hearing device wearer that are outlined at the fitting session and a separate comparison with newly computed parameter values for hearing device wearers having similar characteristics into the adapted parameter values. The process is then concluded by transferring the new parameter values to the hearing aid of the patient (step 10).

FIG. 2 shows a plot 11 in which the current parameter values of a hearing device and the adapted parameter values computed by means of the proposal system are visualized. In this case, compression ratio is plotted against frequency [kHz]. The plot shows three percentiles 12, 13, 14 that are used as a measure of the scatter of a statistical distribution and are based on the values of large comparison collectives. Taking the 50% percentile 13 at 1 kHz as an explanatory example, this means that 50% of the hearing devices have a compression ratio set above 2.3, and 50% of the hearing devices have a compression ratio below 2.3.

In the present case, the hearing device acoustician and the hearing device wearer are offered, as adapted parameter values, a compression ratio of a little above 2.3, that is to say a little above the 50% percentile, which has been ascertained by the proposal system on the basis of the user-specific desired changes as parameter values appropriate to the specific auditory situation (curve 15). The value differs from the original parameter values, that is to say the parameter values that were set in the hearing aid at the time of the auditory situation experienced (curve 16). In this case, the compression ratio has a value of approximately 2.1 at 1 kHz.

The adapted parameter values can now be programmed into the hearing aid. The hearing device wearer is then able to test, in a comparable situation, whether and to what extent the then current settings of the hearing device parameters correspond to his desired auditory perception. Should further changes be desired, then it is possible for changed parameter values to be ascertained again and for the hearing device settings to be adapted accordingly.

The invention claimed is:
1. A method of automatically ascertaining parameter values of a hearing aid, the method comprising:
carrying out a computer-linguistic analysis by analyzing a user-specific blog entry in a weblog on a computer-linguistic basis;

reducing results of the computer-linguistic analysis to such results as are directed to a subjective auditory perception of a user of the hearing aid;

associating the reduced results directed to the subjective auditory perception of the user with a specific auditory situation;

extracting user-specific desired changes from the reduced results directed to the subjective auditory perception of the user; and taking the user-specific desired changes for the specific auditory situation as a basis for ascertaining adaptive parameter values, and offering the adaptive parameter values to the user or an audiologist for adapting parameter values of the hearing aid that are associated with the specific auditory situation.

2. The method according to claim 1, wherein a creation of the user-specific blog entry includes storing the parameter values of the hearing aid that are associated with the blog entry.

3. The method according to claim 1, which comprises transferring the blog entry and the parameter values of the hearing aid that are associated with the blog entry to a backend system.

4. The method according to claim 3, which comprises, prior to transferring the blog entry and of the parameter values of the hearing aid that are associated with said blog entry to the backend system, ascertaining whether a blog entry describing an auditory situation is involved.

5. The method according to claim 1, which comprises ascertaining parameter values adapted to the specific auditory situation by comparing the extracted, user-specific desired changes with proposed changes that are stored in a proposal system and that have associated applicable parameter values for a hearing aid.

6. The method according to claim 5, which comprises using a proposal system containing a patient database to ascertain parameter values adapted to the specific auditory situation.

7. The method according to claim 5, wherein the step of comparing the user-specific desired changes with the proposed changes stored in the proposal system additionally comprises taking into consideration the parameter values of the hearing aid that are associated with the blog entry.

8. The method according to claim 1, which comprises visualizing the parameter values of the hearing aid that are associated with the blog entry and/or the adapted parameter values of the hearing aid.

9. The method according to claim 1, wherein the computer-linguistic analysis comprises analyzing a sentence structure of the blog entry.

10. The method according to claim 1, wherein the computer-linguistic analysis comprises analyzing a content of the blog entry.

11. The method according to claim 1, wherein the weblog is captured in the form of audio signals.

12. The method according to claim 11, wherein the weblog is captured in the form of voice signals.

13. The method according to claim 11, which comprises processing audio signals captured in the web low by way of a voice recognition module.

* * * * *